UNITED STATES PATENT OFFICE.

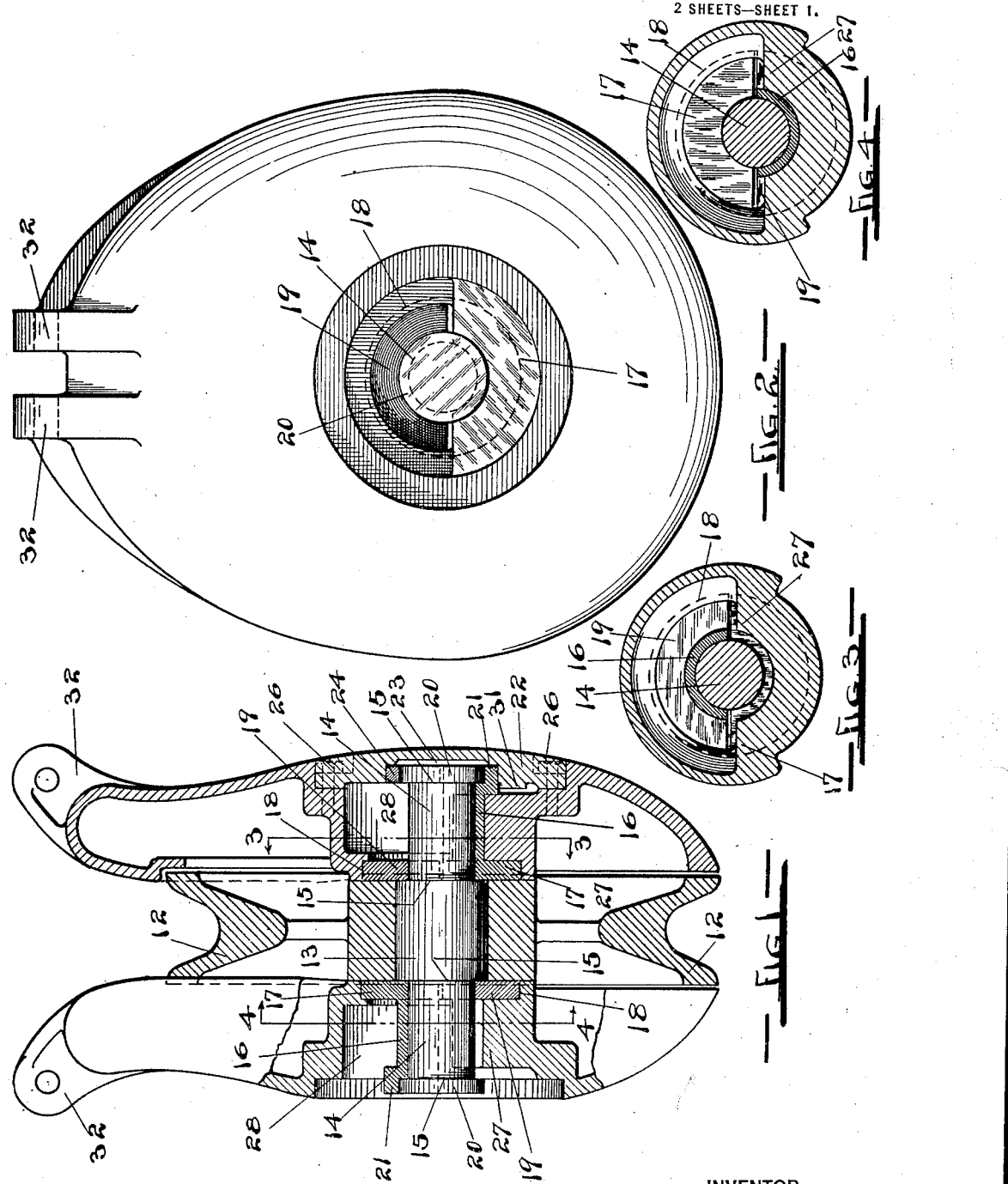

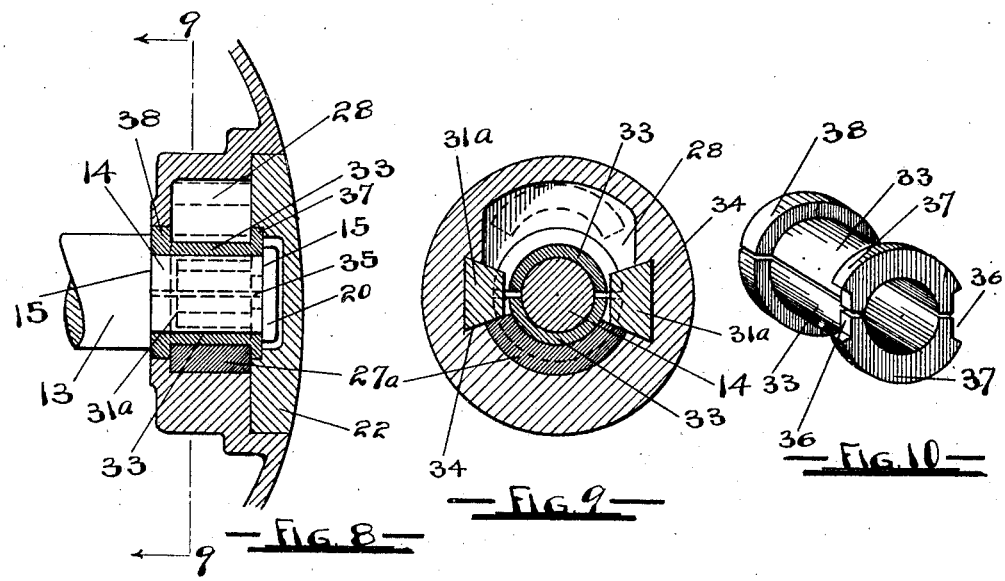
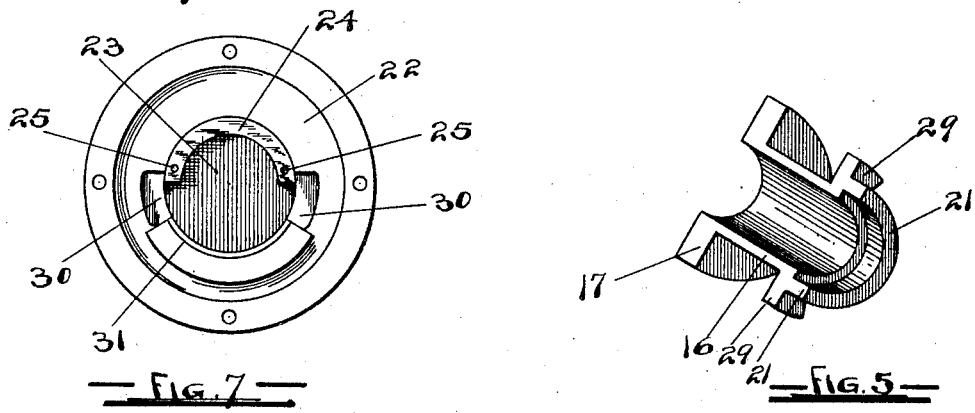
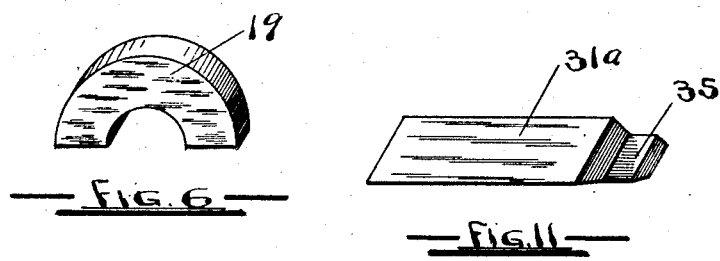

CLINTON F. BLAKE, OF PORTLAND, OREGON, ASSIGNOR TO F. B. MALLORY COMPANY, OF PORTLAND, OREGON.

BLOCK.

1,358,276.   Specification of Letters Patent.   Patented Nov. 9, 1920.

Application filed December 10, 1919. Serial No. 343,962.

*To all whom it may concern:*

Be it known that I, CLINTON F. BLAKE, a citizen of the United States, and a resident of Portland, county of Multnomah, State of Oregon, have invented certain new and useful Improvements in Blocks, of which the following is a specification.

My invention relates to blocks in general, and particularly to that class of blocks known as logging blocks and used in lumber camps for logging operations.

The object of my invention is to provide a block the sides of which are securely tied or fastened together at the sheave pin without the use of screws or bolts, which latter have heretofore given rise to many difficulties in this class of blocks. A further object is to provide a block in which the sheave pin journal is in constant contact with a large body of lubricant, such as grease or oil soaked waste or the like, and in which the lubricant chamber is of such simple construction as to allow of easy cleaning in the foundry where the block sides are cast, thereby eliminating the possibility of core sand remaining in said chamber and ultimately becoming loose and entering the journal bearing.

I accomplish the above objects and other desirable results that will hereinafter appear, by means of the construction illustrated in the accompanying drawings which are a part of this application for Letters Patent, like characters of reference indicating like parts throughout the several views thereof, and in which:

Figure 1 is a sectional elevation of my device.

Fig. 2 is a side elevation of the same, with the cap removed.

Fig. 3 is a section upon line 3—3 of Fig. 1.

Fig. 4 is a section upon line 4—4 of Fig. 1.

Fig. 5 is a perspective view of the half journal bushing.

Fig. 6 is a perspective view of the half collar.

Fig. 7 is an elevation of the inside surface of the cap.

Fig. 8 is a sectional view of the journal box of a modified form of my block side.

Fig. 9 is a section upon line 9—9 of Fig. 8.

Fig. 10 is a perspective view of the journal bushing used in the modified form of Fig. 8.

Fig. 11 is a perspective view of the keys used in the modified form of Fig. 8.

In general my device consists of a sheave secured upon a sheave pin having depressed journals upon each end thereof, block sides with lubricant chambers therein and caps closing said chambers, journal bushings upon said depressed journals, keys secured within said block sides below said lubricant chamber to contact with said journal bushings and secure the latter in place, and means to lock said journal bushings from rotation.

The sheave 12 is secured upon the sheave pin 13 by any convenient means, preferably by making the same a press fit thereon, as illustrated in the drawings. The sheave pin is provided with depressed journals 14, thus providing shoulders 15 upon each end of said journals, between which shoulders the respective journal bushing is a prisoner, and thus secured from longitudinal movement upon the journal.

The journal bushings are constructed with the body portion 16 adapted to fit the journals and of a length to exactly fit between the shoulders 15 thereon. Upon that end of said journal bushing adjacent the sheave 12 there is provided a flange 17 of larger diameter than said body portion 16 and adapted to fit within a counterbore 18 in the block side, as shown in Fig. 1.

A semicircular collar 19 is provided, the same being of the same diameter and thickness as flange 17 of said journal bushing, and therefore when the journal bushing and the half collar are in place upon the journal 14 said flange 17 and said half collar 19 exactly fill said counterbore 18, as shown in Fig. 1.

In forming the shoulders 15 upon the journals 14 a head 20 is left upon the extreme ends of the sheave pin, which head is substantially the same diameter as the central portion of said sheave pin. Upon that end of said journal bushing 16 opposite the end upon which flange 17 is formed, is provided a longitudinally extending flange 21 adapted to contact with the sheave pin heads 20, as shown in Fig. 1.

A cap 22 is provided for each block side to cover the lubricant chamber and sheave pin, said cap having therein upon the inner side thereof a depression 23 adapted to receive said sheave pin head 20, as shown in Fig. 1. Said depression 23 is of a diameter equal to the outside diameter of journal bushing flange 21 which is thereby supported within the cap, and a half bushing 24 is provided and secured to said cap, preferably by rivets 25, within the upper portion of depression 23, as shown in Figs. 1 and 7. Thus the journal bushing flange 21 and the half bushing 24 together completely surround the sheave pin head 20, and when assembled in place the half bushing 24 prevents rotation of the journal bushing 16 by reason of the ends of said half bushing 24 contacting with the ends of the journal bushing flange 21 and said half bushing 24 being secured to cap 22 which latter is secured to the block side by bolts 26.

A key 27 is provided in each block side disposed immediately below the lubricant chamber 28, and secured against either longitudinal or rotative movement within the block side. Preferably this key 27 is rendered immovable within the block side by being constructed integral therewith, as illustrated in Fig. 1, but it may be constructed as a separate member as illustrated in Fig. 8, and hereinafter described. Said key exactly fits between the flanges 17 and 21 of the journal bushing, as shown in Figs. 1 and 8. Thus this key prevents any longitudinal movement of the bushing within the block side, and any rotative movement of the bushing is prevented as described above, and as the sheave pin is prevented by shoulders 15 from any longitudinal movement within the journal bushings, it is evident that no longitudinal movement of the sheave pin within the block side is possible, and that the block sides are positively and securely bound together by the sheave pin bushing and key, without the use of any bolts, screws or other threaded devices.

To assemble the device, the journal bushing 16 and the half collar 19 are placed upon the journal, the bushing being on top thereof, as illustrated in the left hand block side of Fig. 1. The block side is then placed in position, the extreme outside diameter of the bushing being small enough to pass through the opening in the block side adjacent the counterbore 18, and the sheave pin head 20 being of small enough diameter to pass the key 27, as shown in Fig. 1. Thus when the journal bushing is on top of the journal the block side may be placed over the same into position, the half collar 19 being then below the journal, as shown at the left hand side of Fig. 1. The journal bushing 16 and half collar 19 are then rotated upon the journal until the bushing is beneath the same and is in contact with the key 27, as shown at the right hand side of Fig. 1, the half collar then being above the journal. When the parts are in this position the cap 22 may be placed in position, the half bushing 24 thereof embracing the upper portion of the sheave pin head 20, as shown at the right hand side of Fig. 1.

When the cap 22 has been secured in place by the bolts 26 it is evident that all the parts are securely locked together and that no longitudinal movement of the sheave pin relative to the block side is possible, while the sheave pin is free to rotate upon the half bushing 16 and within the half bushing 24 and the half collar 19, and also it is evident that the journal bushing 16 is prevented from rotating within the block side by the half bushing 24.

To provide still further security against rotation of the bushing 16 I provide thereon ears 29 which enter pockets 30 in the cap 22 and which contact with a locking member 31 integral with said cap. The outside diameter of the ears 29 is sufficiently small to allow the ears to pass through the opening in the block sides adjacent the counterbore 18 for assembling purposes.

The lubricant chamber 28 has no reëntrant orifices and is of a construction allowing of easy cleaning in the foundry, thereby eliminating all possibility of core sand remaining within said chamber and eventually becoming detached and entering the journal bearing to cause scoring and destruction thereof.

The sheave pin journal is left unobstructed adjacent the lubricant chamber, thus forming one side thereof, and thereby receiving lubricant constantly and without requiring pressure to force the lubricant to the journal.

Eyes or lugs 32 are provided upon the block sides for the purpose of securing a bail thereto.

In the modified form of my device illustrated in Figs. 8 to 11 inclusive, the key 27ª is formed as a separate member from the block side, and the journal bushings 33 are made in halves two of which are used upon each journal, thus entirely surrounding the journal. With this construction the journal bushings are placed upon the journal and the block side placed in position over the journal bushings. The key 27ª is then placed within the lubricant chamber 28 as shown in dotted lines in Figs. 8 and 9, is lowered upon the journal bushing 33 and then rotated upon said journal bushings until it is in place below the same, as shown in Figs. 8 and 9. In this construction also the locking members 31ª are not integral with the cap 22 as is the locking member 31, but are separate therefrom and are inserted within pockets 34 in the block sides, and secured therein by the cap 22.

The locking members 31ª are each provided with an extension 35 which enters notches 36 in the flanges 37 of the journal bushings 33, and thus said locking members prevent rotation of both the journal bushings 33.

It is evident that by this construction the sheave pin is not only longitudinally locked in the block sides, but also it is securely locked against any transverse movement therein by the half collar 19 and the half bushing 24, and in the modified construction shown in Figs. 8 to 11 inclusive, by the flanges 37 and 38 of the journal bushings. This is a very necessary feature of this device, since if omitted the journal sheave pin frequently assumes an inclined position relative to the block side, as evidenced in practice by worn sheave hubs and block sides, when the pull of the ropes is angular to the plane of the sheave, as frequently happens in practice.

My device may be made of any size, and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a block, a pair of block sides; a sheave pin having depressed journals thereon, thus forming shoulders at each end thereof; a sheave secured upon said pin intermediate said journals; half bushings upon said journals; a key securing said bushings within said block sides; and locking members securing said bushings from rotation.

2. In a block, a sheave pin; journals upon said sheave pin; a sheave secured upon said pin intermediate said journals; a pair of block sides; means within said block sides to secure said journals against longitudinal movement therein; means within said block sides to secure said journals against transverse movement therein; said block sides having a lubricant chamber therein of which chamber said journal forms one side.

3. In a block, a pair of block sides having a lubricant chamber therein; a sheave pin; depressed journals upon said sheave pin with shoulders at each end of said journals; a head upon each end of said sheave pin; a sheave secured to said sheave pin intermediate said journals; a half journal bushing upon each of said journals; a half collar upon each of said journals contacting with said half bushing; a key within each of said block sides securing said half bushing from longitudinal movement therein; a cap upon each of said block sides; a half bushing secured to each of said caps adapted to receive said sheave pin head therein and to contact with said half journal bushing; and a locking member adapted to secure said half journal bushing from rotation within said block side.

4. In a block, a pair of block sides having a lubricant chamber therein; a sheave pin having journals thereon; a sheave secured to said pin intermediate said journals; means to rotatively mount said journals within said block sides in a manner secure against longitudinal and transverse movement therein, and having substantially one half the peripheral surface of said journals exposed to the lubricant within said lubricant chamber.

5. In a block, a pair of block sides; a sheave pin journaled upon half bushings in said block sides; a sheave secured upon said pin intermediate said block sides; means to longitudinally secure said half bushings upon their respective journals; means to longitudinally secure said half bushings within said block sides; means to transversely secure said half bushings within said block sides; and means to secure said half bushings from rotation within said block sides.

6. In a block, a pair of block sides; a sheave pin rotatively journaled within said block sides; a sheave secured to said pin intermediate said block sides; and threadless means to longitudinally secure said block sides to said sheave pin for the purpose of securing said block sides together.

In witness whereof I claim the foregoing as my own I hereunto affix my signature in the presence of two witnesses, at Portland, county of Multnomah, State of Oregon, this 4th day of Dec., 1919.

CLINTON F. BLAKE.

Witnesses:
L. J. ROBINSON,
A. J. GROBEN.